Oct. 27, 1931.  J. W. SWENDSEN  1,829,686
INDUCTION MOTOR
Filed May 28, 1929   2 Sheets-Sheet 1
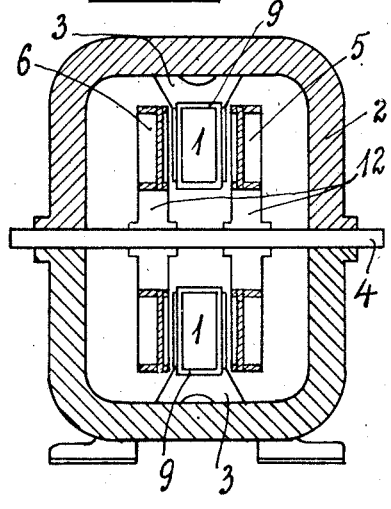
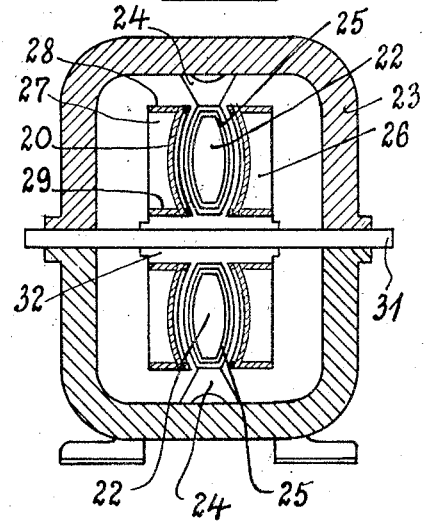
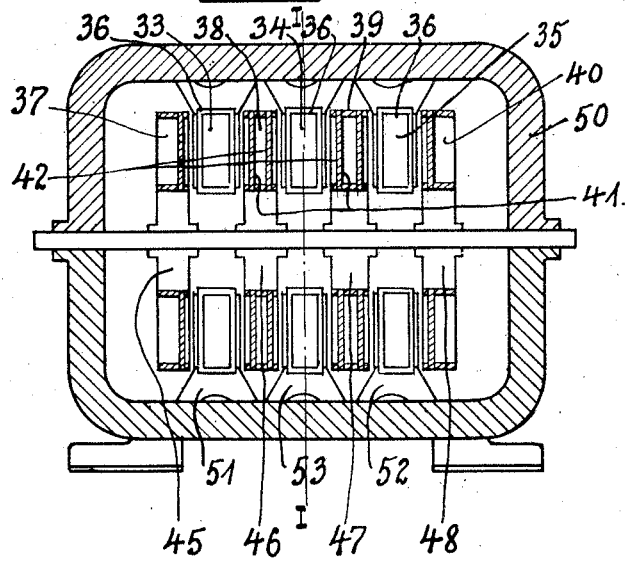
J. W. Swendsen
INVENTOR
By: Marks & Clerk
Attys.

Oct. 27, 1931.  J. W. SWENDSEN  1,829,686
INDUCTION MOTOR
Filed May 28, 1929  2 Sheets-Sheet 2

J. W. Swendsen
INVENTOR

By: Marks & Clerk
Attys.

Patented Oct. 27, 1931

1,829,686

UNITED STATES PATENT OFFICE

JOHAN WALFRED SWENDSEN, OF OSLO, NORWAY

INDUCTION MOTOR

Application filed May 28, 1929, Serial No. 366,733, and in Norway June 2, 1928.

The present invention relates to electric induction motors and particularly to that type of induction motors which employ ring formed magnetic cores instead of the conventionally used cylindrical cores. The ring type magnetic cores have been used before and is in fact the type which was used on the earliest electric motors known. Ring type cores, however, have the extraordinary great disadvantage that the copper winding on the outside does not aid effectively to the performance of the motor and constitutes a tremendous leakage. And even if this drawback is eliminated the manufacture of such flat ring shaped magnetic cores of laminated sheet metal has been very difficult to undertake on a production basis.

A method for the manufacture of disk shaped ring formed magnetic cores provided with the necessary apertures for the copper windings etc. on an economical basis is fully described in the applicant's co-pending patent application Serial Number 366,732, filed May 28, 1929. This manufacture has opened the way for the construction of a new type of electrical dynamos and particularly an induction motor within the squirrel cage class, which in comparison to the conventional squirrel cage motor has several advantages, and which also eliminates the inherent disadvantages of the ring shaped core.

One object for the invention is to provide an induction motor comprising one or more disk shaped stators and two or more disk shaped rotors, where the magnetic core of the stator respectively as well as of the rotors in a previously known manner consists of a spirally wound iron strip of metal forming a ring shaped core, concentrically arranged around the axis of the motor.

A further object of the invention is to provide a motor, as above, where the active part of the rotors are made by winding a metal strip, which first consists of copper, next of sheet metal and finally again of copper in a disk shaped ring, in such a way that the strip of metal under the winding process first forms the electric conducting short circuiting ring, next the magnet core and finally the outer copper ring, the strip in a suitable manner being provided with apertures, forming radial groove or channels serving to receive the short circuiting bars.

A further object of the invention is to provide a motor comprising a series of disk shaped stators in a single motor housing and with a disk shaped rotor in between each pair of stators and one on each end, one or more of the stators being arranged in such a manner that it or they automatically or by hand may be turned through a suitable angle around the axis of the motor, when the motor stops, thereby bringing this or these stators out of phase with relation to the other stator or stators, with the result that the motor, when starting will have the characteristics of a slip ring motor, whereby the displaced stator or stators, after the starting has taken place can automatically or by hand be brought back into phase with the remaining stators.

A motor with magnetic cores according to the invention has several advantages when compared with the ordinary employed motors, for instance the following:

It is easy and inexpensive to manufacture, and the copper losses are less. The radius of gyration of the rotor being larger, provides for an increased fly-wheel effect making the motor more suitable for taking care of sudden loads. The ring wound stator can at any time be changed to different voltages, cycles and phases. By means of additional parts suitable for any motor, another motor with twice or many times the power may be assembled. The shaft stress in a motor of this type will be less than in a corresponding motor, due to the fact that the motor is shorter.

Further purposes and advantages of the motor according to the present invention will be shown in the following description with reference to the drawings.

The drawings illustrate a few constructional examples of the invention.

Fig. 1 is a longitudinal sectional view through an induction motor according to the invention.

Fig. 2 is a corresponding view of a modified form of construction.

Fig. 3 is a section through an induction motor with three stators.

Figure 4:
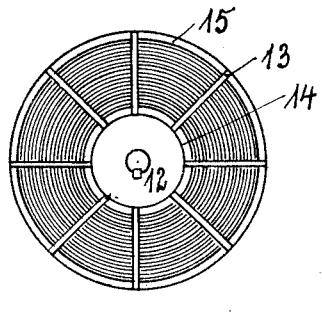
Fig. 4 shows an induction motor seen in the direction of the axis.
Figure 5:
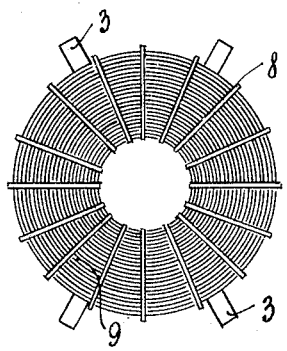
Fig. 5 is a stator seen in the same direction.

In the drawings, Fig. 1, 1 is a stator of an induction motor, which is fixed in the motor frame 2 by means of legs 3. Adjacent to the stator on both sides and carried by a shaft 4 rotors 5 and 6 are placed. The stator 1 consists of a disk shaped cylinder, wound of a metal strip, provided with punchings or apertures, spaced in such a manner in relation to each other, that radial grooves or channels will be formed in the stator, suitable to receive the copper winding 9. Between each layer of sheet metal a layer of paper insulation is placed.

The rotors 5 and 6 are made by winding an iron strip on a copper ring 14, and outside the iron winding is further arranged a copper ring 15. According to the invention, the rotors can also be made by winding the said copper rings from metal strips. In such case the rotors are most adequately wound from a metal strip, partly consisting of copper and partly of iron, a longer piece of iron strip in the middle and shorter copper strips at both ends. The strip of metal from which the rotors are wound is provided with punched holes at suitable distance from each other, in such a manner that when the strip is wound, radial apertures will be formed. The rotor is carried by a hub 12, suitable to be fastened to the shaft 4. The copper part of this spirally wound disk thus forms the inner short circuiting ring; the iron strip will form the magnetic core, and finally the copper will form the outer short circuiting ring.

Figure 7:
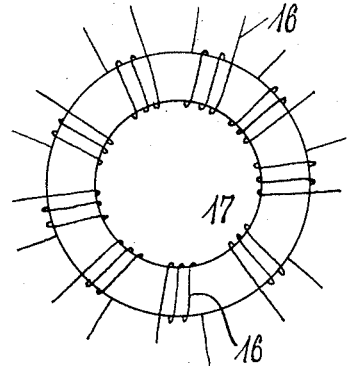
Fig. 7 is a diagram, showing the copper windings of the stator.

The said radial apertures are adapted to receive the copper bars 13, which short circuit the inner ring 14 and the outer ring 15. The copper winding on the stator as shown in Fig. 7, consists of a number of individual coils 16, which are wound around the iron core 17. The respective ends of these coils can as desired be connected in any suitable manner in order to make the stator serviceable in a motor for any voltages, cycles or phases.

In Fig. 2 a section through a second constructional form of an induction motor according to the invention is shown. In order to limit the copper losses and magnetic current losses at that part of the stator which is not facing the rotors, the stator is here given an approximate lens shaped cross section. This is obtained by winding the stator from a metal strip, which to start with is narrow, then gradually widening towards the middle, from where it is again narrowing until the wanted width is obtained. The strip is provided in the manner stated above with punchings, suitable to form apertures which may receive the copper windings. As the strip is wound, the inner and outer part of the stator will get a narrower cross section than the middle one. The rotors are wound in the same manner as previously described of strips, which in this case has such a shape that the finished rotor will fit over the lens shaped stator. As previously mentioned the strips are provided with holes for the purpose of receiving the short circuiting bars. By winding of the motor these holes will get a concave cross section, exactly corresponding to the lens shaped cross section of the stator. In this way a greater percentage of the copper on the stator will aid directly to the performance of the motor, and the efficiency of the motor will consequently be increased.

This motor consists of a lens shaped stator 22, which is clamped firm in the motor frame 23, by means of legs 24. The stator is provided with copper windings 25. On each side of the stator, rotors 26 and 27 are arranged, having an external and internal copper ring 28, 29 connected with short circuiting bars 20. The rotors are fastened to the shaft 31 by means of a hub 32.

Figure 6:
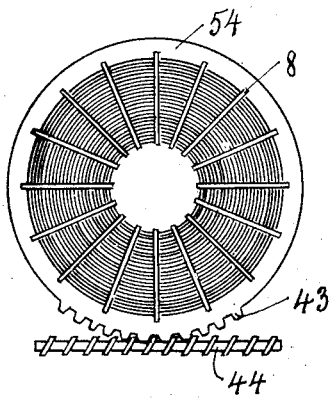
Fig. 6 shows a section after the line I—I in Fig. 3.

Fig. 3 shows an induction motor, which consists of ring wound stators 33, 34 and 35 with copper coils 36. Between the stators and on each side of these are arranged rotors 37, 38, 39 and 40. The rotors for each end of the motor correspond to the rotors described with reference to Fig. 1. The two intermediate rotors may be provided with two sets of short circuiting bars 41, 42. With exception of the middle one, the stators can preferably be constructed in exactly the same manner as described with reference to Fig. 1, the middle stator, however, may be arranged adjustably around the axis of the motor, whereby it may be twisted out of phase with the two remaining stators, and may for this purpose in its circumference be provided for instance with teeth 43, which are meshing with worms 44, Fig. 6. The middle stator or any other stator, as the case may be, may be adjusted at will by means of a handwheel—not shown—fastened to the worm 44. The rotors are fastened to a common shaft by means of a hub 45, 46, 47, 48.

The stators and rotors for this motor can of course also be made in the form as described in connection with Fig. 2.

The motor shown in Fig. 3 has the advantage that besides being cheap in manufacture and having a squirrel cage motor's working characteristics, it may by twisting of the middle stator be adjusted in such a manner that its starting characteristic will correspond to that of a slip ring motor. Further, this turnably mounted stator may in its circumference be provided with a ring 54 which is received in suitable guide in the motor housing. On the lower part of the ring 54, this may be provided with a worm wheel tooth section 43 in mesh with a worm 44. The angular relation between the worm wheel teeth and the axis of the worm may be such that the stator—when the power is applied—will overcome the friction between and slowly turn back into phase relation with the fixed stators. The worm 44 may be operated either manually or mechanically as desired.

Besides that this arrangement is advantageous at the starting it also makes the manufacture of a squirrel cage type motor which can be started under load possible; it further makes it possible to vary the speed of revolution of the motor to an extraordinary great extent.

The particular details indicated in the foregoing description should only be considered as serving to explain the idea of the invention, which is by no means limited to these details.

Claims:

Induction motor with disk shaped stator and rotor comprising magnetic elements consisting of a long strip of sheet metal wound into a disk shaped magnetic element with a hole in the middle, concentrically arranged around the axis of the motor, characterized by the fact that the metal strip forming the rotor elements consists of copper with an intermediate section of good magnetic iron in the middle, in such a manner that when the strip is wound into a disk-like member, the copper will first form an inner short circuiting ring, then the iron will form the magnetic core, an outside short circuiting ring, radially disposed copper bars electrically connected with said inner and outer rings, said rings and the iron core having radially arranged apertures for receiving said bars.

In testimony whereof I have signed my name unto this specification.

JOHAN WALFRED SWENDSEN.